(12) United States Patent
Schaefer

(10) Patent No.: US 10,622,884 B2
(45) Date of Patent: Apr. 14, 2020

(54) ELECTRIC CIRCUIT ARRANGEMENT FOR THE INPUT PROTECTION CIRCUIT OF A SWITCHING POWER SUPPLY AND A SWITCHING POWER SUPPLY

(71) Applicant: BENDER GMBH & CO. KG, Gruenberg (DE)

(72) Inventor: Oliver Schaefer, Gruenberg (DE)

(73) Assignee: BENDER GMBH & CO. KG, Gruenberg (DE)

( * ) Notice: Subject to any disclaimer, the term of this patent is extended or adjusted under 35 U.S.C. 154(b) by 0 days.

(21) Appl. No.: 16/139,231

(22) Filed: Sep. 24, 2018

(65) Prior Publication Data

US 2019/0097523 A1    Mar. 28, 2019

(30) Foreign Application Priority Data

Sep. 26, 2017   (DE) .................. 10 2017 217 132

(51) Int. Cl.
*H02M 1/32*    (2007.01)
*H02M 1/12*    (2006.01)
(Continued)

(52) U.S. Cl.
CPC ............. *H02M 1/32* (2013.01); *H01C 7/12* (2013.01); *H01F 17/00* (2013.01);
(Continued)

(58) Field of Classification Search
CPC ... H02M 1/32; H02M 2001/123; H01F 17/00; H01F 2017/0093; H01C 7/12; H02H 7/1252

See application file for complete search history.

(56) References Cited

U.S. PATENT DOCUMENTS 5,555,150 A  *  9/1996  Newman, Jr. .......... H02H 9/005
                                                                361/56
6,947,266 B1     9/2005  Billingsley
                         (Continued)

FOREIGN PATENT DOCUMENTS

CN    201774465 U    3/2011
CN    201928497 U    8/2011
                     (Continued)

*Primary Examiner* — Kyle J Moody
(74) *Attorney, Agent, or Firm* — King & Schickli, PLLC

(57) ABSTRACT

The invention relates to an electric circuit arrangement for the input protection circuit of a switching power supply, having a surge protection circuit, which is contacted with a supply voltage on an input side and to which a current-compensated choke is connected as a suppression component, said current-compensated choke being connected to a rectifier circuit comprising an energy storage means on an output side. Via modifications to the circuit technology, such as using two varistors as surge protections, and by using suitable switching elements, such as silicon diodes as rectifier elements and ceramic capacitors as an energy storage means, the input protection circuit is designed such that the requirements, which an expanded input voltage range demands of a surge circuit, are fulfilled. Furthermore, the invention relates to a switching power supply having an electric circuit arrangement according to the invention for the input protection circuit.

3 Claims, 4 Drawing Sheets

Figure 1:
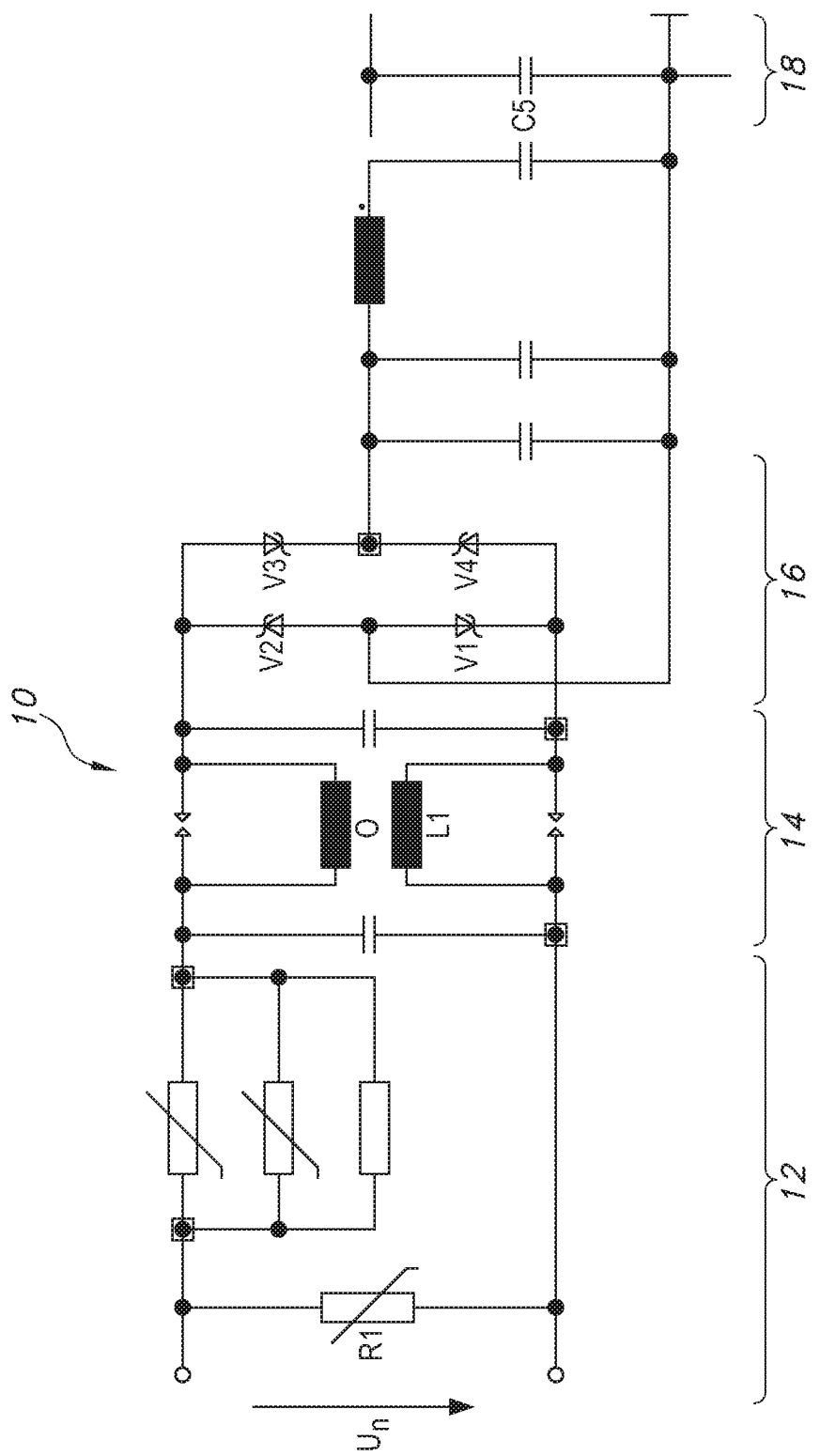

(51) Int. Cl.
*H02M 1/44* (2007.01)
*H02M 7/06* (2006.01)
*H02M 1/42* (2007.01)
*H01C 7/12* (2006.01)
*H01F 17/00* (2006.01)
*H02H 7/125* (2006.01)
*H02H 9/00* (2006.01)
*H02H 9/04* (2006.01)

(52) U.S. Cl.
CPC ............ *H02H 7/1252* (2013.01); *H02M 1/12* (2013.01); *H02M 1/126* (2013.01); *H02M 1/4208* (2013.01); *H02M 1/44* (2013.01); *H02M 7/062* (2013.01); *H02M 7/066* (2013.01); *H01F 2017/0093* (2013.01); *H02H 9/005* (2013.01); *H02H 9/041* (2013.01); *H02M 2001/123* (2013.01)

(56) References Cited

U.S. PATENT DOCUMENTS

| | | | |
|---|---|---|---|
| 8,520,355 B2 * | 8/2013 | Wright | H02H 9/041 361/118 |
| 2012/0026639 A1 | 2/2012 | Wright et al. | |
| 2012/0044599 A1 * | 2/2012 | Veskovic | H02H 9/005 361/18 |
| 2015/0207449 A1 | 7/2015 | Clendenen et al. | |

FOREIGN PATENT DOCUMENTS

| | | |
|---|---|---|
| EP | 2779394 A2 | 9/2014 |
| KR | 20110055924 A | 5/2011 |
| WO | WO2010046247 A1 | 4/2010 |

\* cited by examiner

ELECTRIC CIRCUIT ARRANGEMENT FOR THE INPUT PROTECTION CIRCUIT OF A SWITCHING POWER SUPPLY AND A SWITCHING POWER SUPPLY

This application incorporates by reference the disclosure of German Patent Application no. 10 2017 217 132.4, filed Sep. 26, 2017.

TECHNICAL FIELD

The invention relates to an electric circuit arrangement for the input protection circuit of a switching power supply, having a surge protection circuit, which is contacted with a supply voltage on an input side and to which a current-compensated choke is connected as a suppression component, said current-compensated choke being connected to a rectifier circuit comprising an energy storage means on an output side.

Furthermore, the invention relates to a switching power supply having an electric circuit arrangement according to the invention for the input protection circuit.

BACKGROUND

In order to supply power from a power supply system (power supply grid) to electric devices, which require a defined supply voltage, power supplies, in particular switching power supplies, are used. These transform a nominal mains voltage (also referred to as mains voltage or nominal voltage in the following), which is supplied by the power supply grid and is contacted with the power supply as an input voltage, to a supply voltage suitable for the electric device. Since the power supply systems installed worldwide differ from each other and can comprise nominal voltages of different magnitudes depending on the area of application, a plurality of power supplies is required for covering the large spectrum of nominal voltages.

According to the state of the art, two groups of power supplies relating to the input voltage range of the power supply have established themselves on the market—AC/DC power supplies for nominal voltages of 24 V to 60 V (also called U1-NT) and AC/DC power supplies for nominal voltages from 100 V to 240 V (also called U2-NT).

Different producers distribute these power supplies on the market as individual devices or power supply modules.

These known power supplies have an input protection circuit which is calibrated to the respective input voltage range, with the dynamic range of the input voltage being 4:1 at most.

In order to be as effective as possible, efforts are made to keep the power loss of the input protection circuit as low as possible.

In a U1-NT, the bridge rectifier is therefore equipped with Schottky diodes which have a maximum reverse voltage of 200 V. The threshold voltage is only 0.3 V in this instance since an input current of 0.75 A and an output load of 10 W flow in small input voltages of 19.2 V ("24 V−20%") when the efficiency is 70%. The power loss across the 2-fold diode path is 0.5 W in this instance.

In other impedances, such as current-compensated chokes (German: Drosseln or Drosselspulen), efforts are made to construct said impedances with an as small as possible ohmic resistance value in order to not cause any further additional losses.

The energy storage means arranged on the output side in the input protection circuit is dimensioned in the form of a buffer capacitor such that its ESR (Equivalent Series Resistance) only generates small loses in high circuit currents.

In a U2-NT, however, other priorities apply for the input protection circuit. For this purpose, the components must be designed for larger voltages since a voltage of up to 400 V is contacted with the DC intermediary circuit.

The currents flowing through the longitudinal elements are significantly smaller in this range, i.e. only 0.14 A flow in an input voltage of 100 V and an efficiency of 70% as well as in output performances of 10 W.

Schottky diodes as rectifier elements are rejected due to a too small maximum reverse voltage of approx. 200 V. Therefore, silicon bridge rectifiers having a reverse voltage of 1 kV are preferably used in this instance.

The energy storage means (buffer capacitor) takes up a large construction space in the U2-NT. The ESR of the U2-NT is not a crucial factor due to the relatively small circuit currents flowing therein but the type of electrolyte capacitor used in a U2-NT cannot be used in the same manner for a U1-NT because of the large heat build-up.

In some product norms, an impulse voltage test of 4 kV symmetric and 2 kV asymmetric is required. In practice, however, the most switching power supplies are constructed only for lower requirements of 2 kV symmetric and 1 kV asymmetric.

The relatively large construction space required for power supplies and power supply modules available on the market has proven to be a further disadvantage, since it complicates the integration into other devices.

It can be therefore said that thus far two power supply varieties had to be produced for the market, whose respective input protection circuit either covers the lower (U1-NT) or the upper (U2-NT) mains voltage range. Accordingly, the number of devices distributed by manufactures is doubled while simultaneously increasing costs in development, manufacture, storage and dispatch, for example.

SUMMARY

The objective of the present invention is therefore to develop an input protection circuit for a switching power supply which can process a widest possible range of nominal mains voltages and moreover requires a small construction space.

This objective is attained for an electric circuit arrangement according to the preamble of claim 1 by the surge protection circuit being formed by a first and a second varistor, said first varistor being arranged upstream of the current-compensated choke and said second varistor being arranged downstream of the current-compensated choke; by the current-compensated choke being dimensioned such that it has a smallest possible ohmic resistance and a largest possible inductivity; by the rectifier circuit comprising silicon diodes having an average forward current of at least 5 A; by the energy storage means being realized as a ceramic capacitor; and by conducting path fuses covered by casting material being integrated into a conductor plate as a surge protection device.

The fundamental idea of the present invention advantageously rests on designing the input protection circuit via modifications to the circuit technology and by using suitable circuit elements such that the requirements, which an expanded input voltage range presents to a protection circuit, are fulfilled.

By using two varistors, transient surges of the in-contact mains voltage are limited. By arranging a first varistor upstream of the current-compensated choke and a second varistor downstream of the current-compensated choke, fulfilling the requirements to a standardly required 4 kV impulse voltage test becomes possible without additional external components.

For suppressing radio interference voltages, which occur via quick switching processes in conjunction with parasitic capacities and parasitic inductivities, a current-compensated choke is used as a suppression component.

The current-compensated choke comprises an as low as possible ohmic resistance and an as high as possible inductivity. This is attained by a correspondingly large conductor cross section of the copper windings and a core material having a high permeability. Thus, the voltage drop and the thus resulting ohmic losses are slight while having a compact design at the same time.

Silicon diodes having an average conducting current of at least 5 A are built into the rectifier circuit. The layout for 5 A represents an intentional oversizing for the application at hand but, as compared to diode types having an average rectifier current of 1 A in the same casing and also being sufficient for the application, the voltage contacted with the diode is lower according to the data sheet for 5-Ampere diode types at a conducting current of 0.75 A, for example. This also leads to a lower power loss since it is proportional to the product of the voltage contacted with the diode and to the current flowing through the diode.

Instead of electrolyte capacitors, which are typically used, ceramic capacitors are used as an energy storage means for buffering the outlet voltage of the input protection circuit. These ceramic capacitors have a low ESR whereby the losses can be kept low and an acceptable efficiency can be attained even during small input voltages and thus large current spikes.

Conducting path fuses covered by a casting compound are integrated in a conductor plate, which carries the circuit elements, as surge protection devices. These conducting path fuses take over the short-circuit protection and take up less construction space as compared to typically used glass fuses.

Via measures regarding circuit technology and by choosing suitable components, the power loss can be minimized in particular in low input voltages without impeding the electric strength and without significantly increasing construction space.

Furthermore, the invention comprises a switching power supply which comprises the electric circuit arrangement according to the invention for the input protection circuit.

As a component of a switching power supply, the electric circuit arrangement realized according to the invention is thus capable of processing grid voltages ranging from 24 to 240 V as an input voltage of a power supply or of a power-supply module. At most a dynamic range of the input voltage of 16:1 can be attained.

Instead of two power supply variations each having a specific input protection circuit for the input voltage ranges ranging from 24 to 60 V or from 100 to 240 V, only a wide-range switching power supply having the electric circuit arrangement according to the invention is required in order to cover the mains voltage range ranging from 24 to 240 V.

For controlling the function progress in the switching power supply, a power-factor-control control system (PFC controller) is advantageously used.

The PFC controller generally consists of two control circuits, a first control circuit (power-control circuit) tracking the input current of a performance factor pre-controller proportional to the momentary value of the input voltage. If this current follows the sine-shaped input voltage, the mains current is also sine-shaped and in phase with the mains voltage and accordingly the performance factor is equal to one.

A second control circuit (voltage-control circuit) tracks the effective value of the choke current such that an average output voltage of the performance factor pre-controller remains consistent despite different output performances.

In contrast to a classic Current Mode Flyback Controller, the energy storage device can be realized having a smaller capacity in the PFC topology. This additionally also leads to a smaller construction space.

BRIEF DESCRIPTION OF THE DRAWING FIGURES

Figure 2:
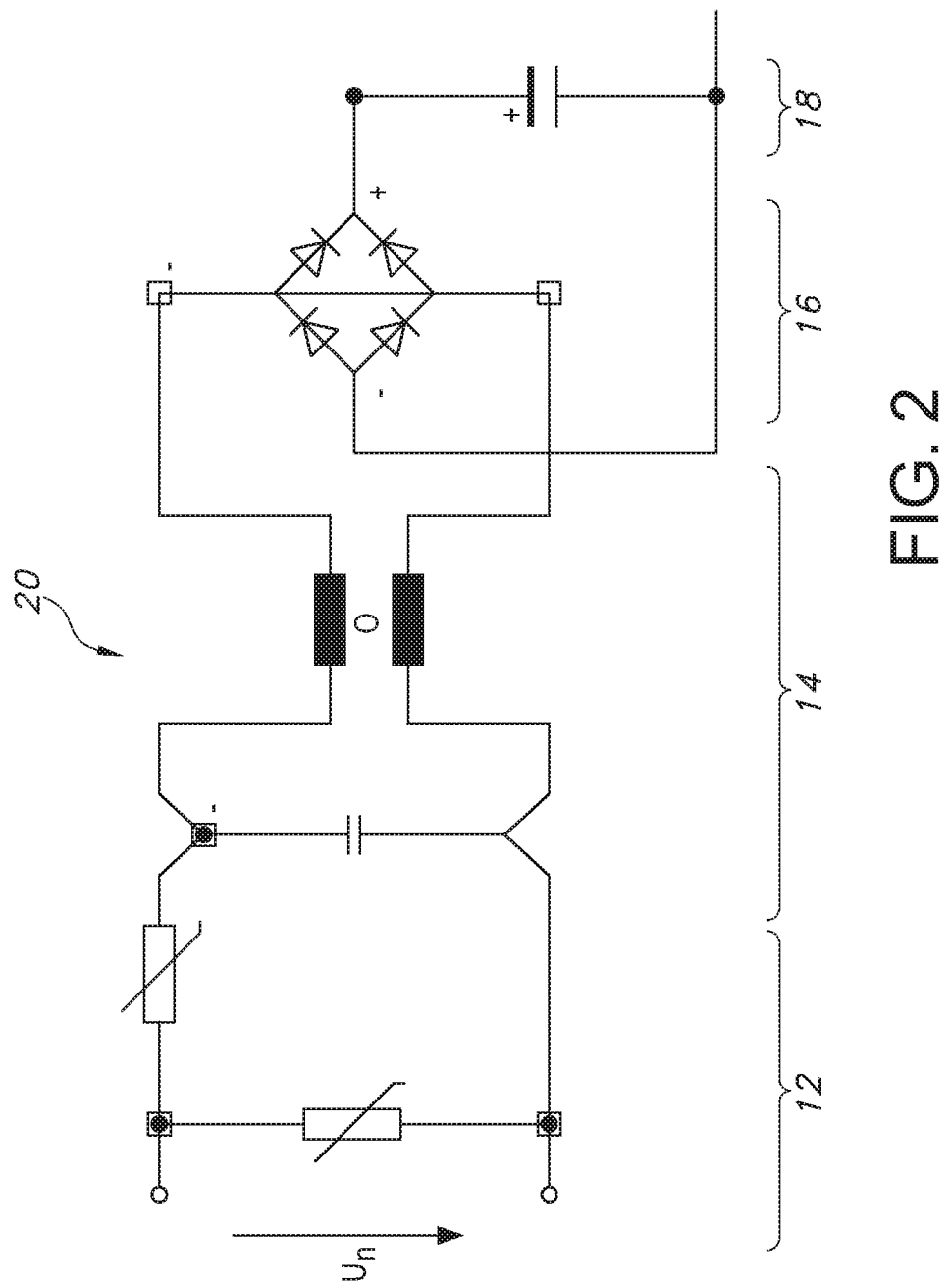
Figure 3:
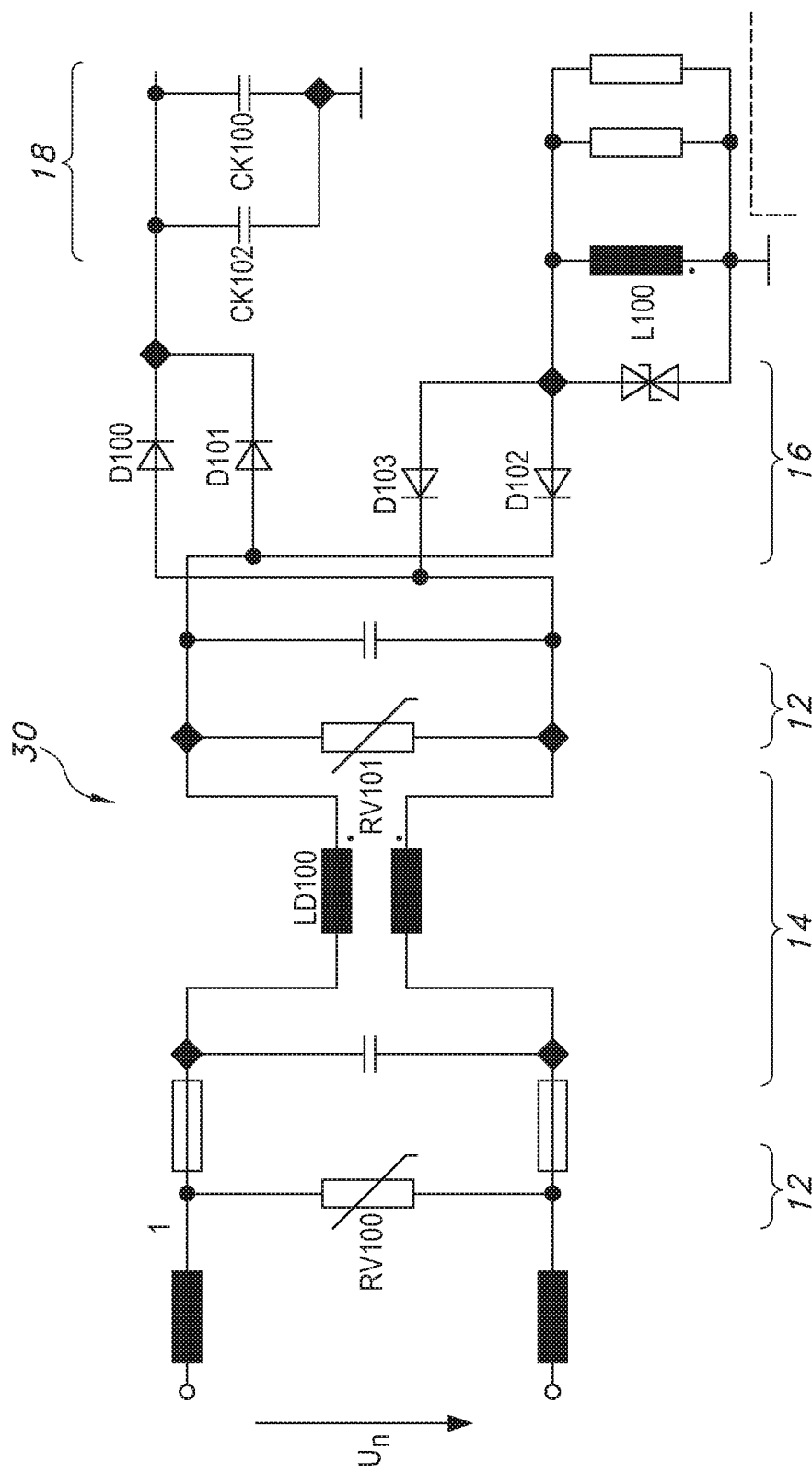

Further advantageous features of embodiments can be derived from the following description and the drawings, which describe a preferred embodiment of the invention by means of an example. In the following, FIG. 1 illustrates an input protection circuit of a U1 power supply according to the state of the art, FIG. 2 illustrates an input protection circuit of a U2 power supply according to the state of the art, and FIG. 3 illustrates an electric circuit arrangement according to the invention for an input protection circuit of a wide-range power supply.

Figure 4:
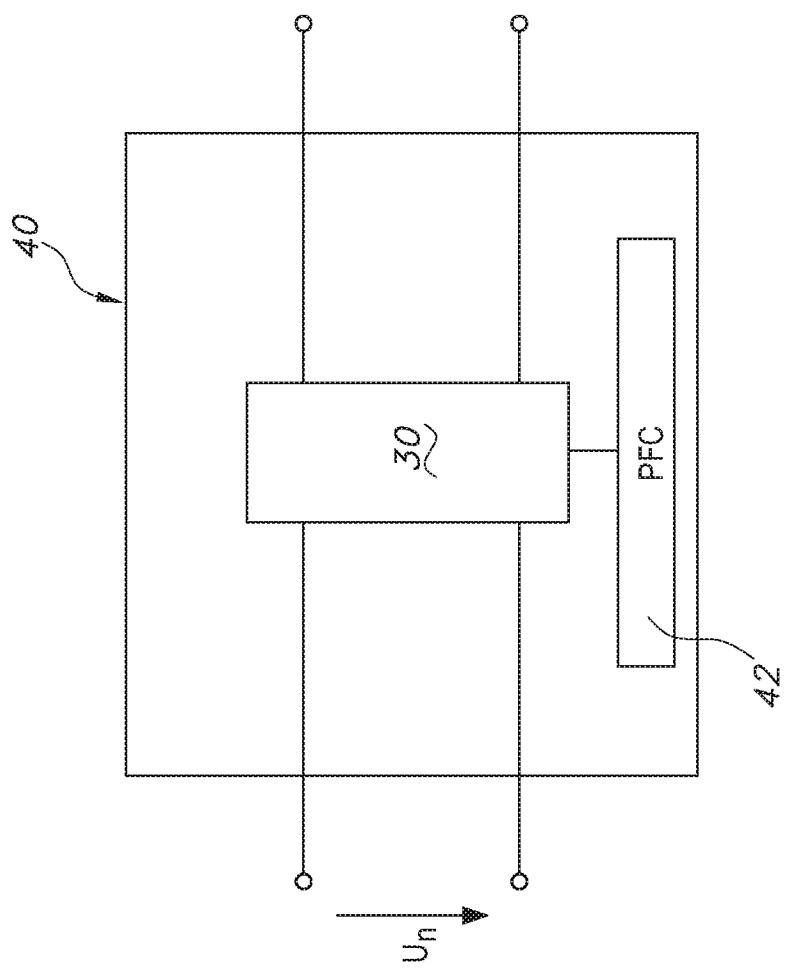

FIG. 4 illustrates a schematic block diagram of a switching power supply.

DETAILED DESCRIPTION

In FIG. 1, an electric circuit arrangement 10 is illustrated for the input protection circuit of a U1 power supply according to the state of the art.

The circuit arrangement 10 essentially comprises four functional component groups which can be illustrated as circuits of consecutive signal processing steps starting from a mains voltage $U_n$ (input voltage of the circuit arrangement 10) contacted on an input side.

On the input side, a surge protection circuit 12 is subjected to the mains voltage $U_n$. The surge protection circuit 12 comprises a varistor R1 and, if required, further partially changeable resistances in order to attenuate transient surges in the mains voltage $U_n$.

A current-compensated choke L1 abuts thereto as a suppression component 14, high-frequency interference transmissions being mostly suppressed by means of said current-compensated choke L1.

In the next signal processing step, a rectification occurs in a rectifier circuit 16 by means of a bridge rectifier which is equipped with Schottky diodes V1 to V4.

The output voltage of the input protection circuit 10 is buffered by means of an energy storage means 18 which is realized as an electrolyte capacitor C5.

FIG. 2 illustrates an electric circuit arrangement 20 for the input protection circuit of a U2 power supply according to the state of the art.

This circuit arrangement 20 for a U2 power supply illustrates the same general layout as the circuit arrangement 10 for a U1 power supply, consisting of a surge protection circuit 12, a suppression component 14, a rectifier circuit 16 and an energy storage means 18.

However, the circuit elements are subject to different marginal conditions relating to circuit technology due to the differing voltages and currents and are therefore dimensioned differently according to the requirements.

FIG. 3 illustrates an electric circuit arrangement 30 according to the invention for the input protection circuit of a wide-range power supply.

In this instance as well, the input protection circuit 30 is based on a surge protection circuit 12, a suppression component 14, a rectifier circuit 16 and an energy storage means 18, however, these functional component groups are modified regarding circuit technology and are provided with special circuit elements in order to enable a protection circuit for an input voltage range which is higher than the input voltage range of a U1 or a U2 power supply.

Thus it can be seen in FIG. 3 that the surge protection circuit 12 is made of a first varistor RV100 and a second varistor RV101, said first varistor RV100 being disposed upstream of the current-compensated choke LD100 starting from the circuit input, i.e. as viewed from the in-contact mains voltage $U_n$, and said second varistor RV101 being disposed down-stream of the current-compensated choke LD100.

FIG. 4 shows a switching power supply 40 according to the invention comprising the electric circuit arrangement 30 and a power factor control system 42 for controlling the progress of the functions performed in the switching power supply 40.

The current-compensated choke LD100 principally is targeted at suppressing common-mode interfering currents and consists of one highly permeable ring core, on which two windings are disposed, through which the current flows in opposite directions.

Highly permeable manganese-zinc ferrites (material K7000) are preferably used as ring cores, as they can be operated in a frequency range ranging from 10 kHz to 1 MHz and have an outer diameter of 16 mm, an inner diameter of 9.6 mm and a height of 6.3 mm. The AL value (inductivity per winding number squared) of such a core is yielded at 4150 nH.

Another longitudinal inductivity L100 is added for suppressing the differential-mode interference emissions which is switched at an output of the rectifier circuit 16 against mass.

For this purpose, each of these—in total three—spools comprises a winding having one ohmic resistance of 0.5Ω to 1Ω in each instance, as can be yielded from the following description.

A switching power supply in the performance range to 20 W typically has an efficiency between 75 to 85%, i.e. the entire power loss is 15 to 25% of the input performance. The power loss in the input circuit should not surpass 5% and is therefore approx. ¼ of the entire power loss. Starting from a desired initial performance of the switching power supply of 10 W and an efficiency of 80%, an input performance of 12.5 W is therefore required, from which an input current $I_{in}$ of 0.625 A is yielded at an input voltage of 20 V (the input voltage is largest in small input voltages).

The entire power loss $P_v$ is (12.5 W−10 W)=2.5 W. From this, an overall ohmic resistance is calculated at $R_{Cu}=\frac{1}{4}*P_v/I_{in}^2$=1.6Ω. Divided onto a total of three required spools, an ohmic winding resistance of 0.53Ω per spool is yielded.

The inductivity of the current-compensated choke LD100 consisting of two spools is preferably 20 mH to 30 mH per spool. The inductivity of the other longitudinal inductivity L100 is in the range of 1 mH.

The bridge rectifier circuit 16 is made of 1000 V silicon diodes D100 to D104. In a intentional oversizing, said diodes have an average conducting current of 5 A in order to generate an as low as possible power loss.

On the output side, two 450 V ceramic capacitors CK100 and CK102, each having 2.2 μF, are installed for buffering the output voltage of the input protection circuit.

On the input side, the circuit arrangement has two conductor path fuses as a surge protection device, which are integrated into a conductor plate and are covered by a casting compound. Said conductor path fuses are preferably realized as two 0.2 mm*5 mm galvanized solder paths in order to safely separate them when a short circuit occurs.

The invention claimed is:

1. An electric circuit arrangement (30) for an input protection circuit of a switching power supply, having a surge protection circuit (12), which is contacted with a supply voltage on an input side and to which a current-compensated choke is connected as a suppression component (14), said current-compensated choke being connected to a rectifier circuit (16) comprising an energy storage means (18) on an output side, characterized in that the surge protection circuit (12) is formed by a first and a second varistor (RV100, RV101), said first varistor (RV100) being arranged upstream of the current-compensated choke (LD100) and said second varistor (RV101) being arranged downstream of the current-compensated choke (LD100), in that the current-compensated choke (LD100) is dimensioned such that it has an ohmic resistance of 0.5 ohms to 1.0 ohms and an inductivity of 20 mH to 30 mH per spool, in that the rectifier circuit (16) comprises silicon diodes (D100 to D104) having an average forward current of at least 5 Amperes, in that the energy storage means (18) is realized as a ceramic capacitor (CK100, CK102), and in that conducting path fuses covered by a casting compound are integrated in a conductor plate as surge protection devices.

2. The switching power supply, characterized by the electric circuit arrangement for the input protection circuit according to claim 1.

3. The switching power supply according to claim 2, characterized by a power-factor-control control system for controlling a function sequence.

* * * * *